United States Patent [19]

Preston et al.

[11] Patent Number: 5,424,595
[45] Date of Patent: Jun. 13, 1995

[54] INTEGRATED MAGNETIC BEARING/SWITCHED RELUCTANCE MACHINE

[75] Inventors: Mark A. Preston; James P. F. Lyons, both of Niskayuna, N.Y.; Eike Richter, Cincinnati; Kiyoung Chung, West Chester, both of Ohio

[73] Assignee: General Electric Company, Cincinnati, Ohio

[21] Appl. No.: 361,917

[22] Filed: Dec. 22, 1994

Related U.S. Application Data

[63] Continuation of Ser. No. 57,224, May 4, 1993, abandoned.

[51] Int. Cl.$^6$ .................... H02K 7/09; H02K 19/06
[52] U.S. Cl. .................... 310/90.5; 310/168
[58] Field of Search .................... 310/90.5, 162, 163, 310/166, 168; 318/701, 702

[56] References Cited

U.S. PATENT DOCUMENTS

| | | | |
|---|---|---|---|
| 2,488,734 | 11/1949 | Mueller | 310/49 R |
| 3,079,574 | 2/1963 | Garcia | 310/90.5 |
| 3,184,271 | 5/1965 | Gilinson, Jr. | 310/90.5 |
| 3,224,818 | 12/1965 | Sixsmith | 310/90.5 |
| 3,572,854 | 3/1971 | Danby | 310/90.5 |
| 4,683,391 | 7/1987 | Higuchi | 310/90.5 |
| 4,792,710 | 12/1988 | Williamson | 310/90.5 |
| 4,841,204 | 6/1989 | Studer | 310/90.5 |
| 4,990,843 | 2/1991 | Moren et al. | 318/701 |
| 5,053,662 | 10/1991 | Richter | 310/90.5 |
| 5,220,222 | 6/1993 | Shtipelman | 310/90.5 |
| 5,237,229 | 8/1993 | Ohishi | 310/90.5 |

FOREIGN PATENT DOCUMENTS

| | | | |
|---|---|---|---|
| 2406790 | 8/1975 | Germany | 310/90.5 |
| 0242153 | 10/1988 | Japan | 310/90.5 |
| 0032338 | 2/1991 | Japan | 310/90.5 |
| 4-107318 | 4/1992 | Japan | |

OTHER PUBLICATIONS

Chiba A., Chida K., Fukao T., "Principles and Characteristics of a Reluctance Motor with Windings of a Magnetic Bearing", pp. 919–926.

Kim K. K., and Kim K. I., "Theory of A Synchronous Machine With A Self-Levitated Rotor", Electric Machines and Power Systems, Hemisphere, 1990, pp. 383–392.

Primary Examiner—Clayton E. LaBalle
Attorney, Agent, or Firm—Andrew C. Hess; David L. Narciso

[57] ABSTRACT

The invention comprises a switched reluctance machine including a stator and a rotor wherein the stator includes stator teeth wound with separately excitable phase windings. The separately excitable phase windings receiving a combination of signals wherein the first of those signals is a phase winding signal and the second of those signals is a magnetic bearing signal. A method of controlling a switched reluctance machine wherein the switched reluctance machine includes separately excitable stator windings. The method comprising the steps of exciting each stator winding with a signal representative of the phase excitation for that winding and superimposing on each of said windings a signal capable of producing the magnetic force necessary to support the rotor in the absence of a mechanical bearing.

19 Claims, 2 Drawing Sheets

INTEGRATED MAGNETIC BEARING/SWITCHED RELUCTANCE MACHINE

This is a continuation of U.S. application Ser. No. 08/057,224, filed on May 4, 1993, now abandoned.

The present invention relates, in general to switched reluctance machines and more particularly to a switched reluctance machine including a magnetic bearing.

BACKGROUND OF THE INVENTION

Magnetic bearings are well known in the art and it has been proposed to incorporate such bearings into many types of motors by including additional windings on the stator poles. Excitation of these bearing windings induces radial forces on the rotor which may be used to support the rotor in the absence of mechanical bearings.

The use of such bearing windings, while advantageous, increases the complexity and size of the motor. In such motors, the magnetic bearing windings are wound on the stator poles with the stator phase windings. In addition, the magnetic bearing windings and the stator phase windings must be controlled separately.

In switched reluctance machines, the stator poles are normally wound in series such that, for a three phase machine with twelve stator poles, each phase winding would consist of four series subwindings. The subwindings would be radially spaced around the stator at equal intervals. Since the introduction of separate magnetic bearing windings would increase the size of the motor and complicate manufacture of the switched reluctance machine, it would be advantageous to use the existing phase windings of a switched reluctance machine to create the magnetic forces necessary to support the rotor in the absence of a mechanical bearing.

SUMMARY OF THE INVENTION

The invention comprises a switched reluctance machine including a stator and a rotor wherein the stator includes stator teeth wound with separately excitable phase windings. The separately excitable phase windings receiving a combination of signals wherein the first of those signals is a phase winding signal and the second of those signals is a magnetic bearing signal.

The invention further comprises a method of controlling a switched reluctance machine wherein the switched reluctance machine includes separately excitable stator windings. The method comprising the steps of exciting each stator winding with a signal representative of the phase excitation for that winding and superimposing on each of said windings a signal capable of producing the magnetic force necessary to support the rotor in the absence of a mechanical bearing.

BRIEF DESCRIPTION OF THE DRAWINGS

The novel features of the invention are set forth with particularity in the appended claims. The invention itself, however, both as to organization and method of operation, together with further objects and advantages thereof, may best be understood by reference to the following description taken in conjunction with the accompanying drawings in which:

DETAILED DESCRIPTION OF THE INVENTION

Figure 1:
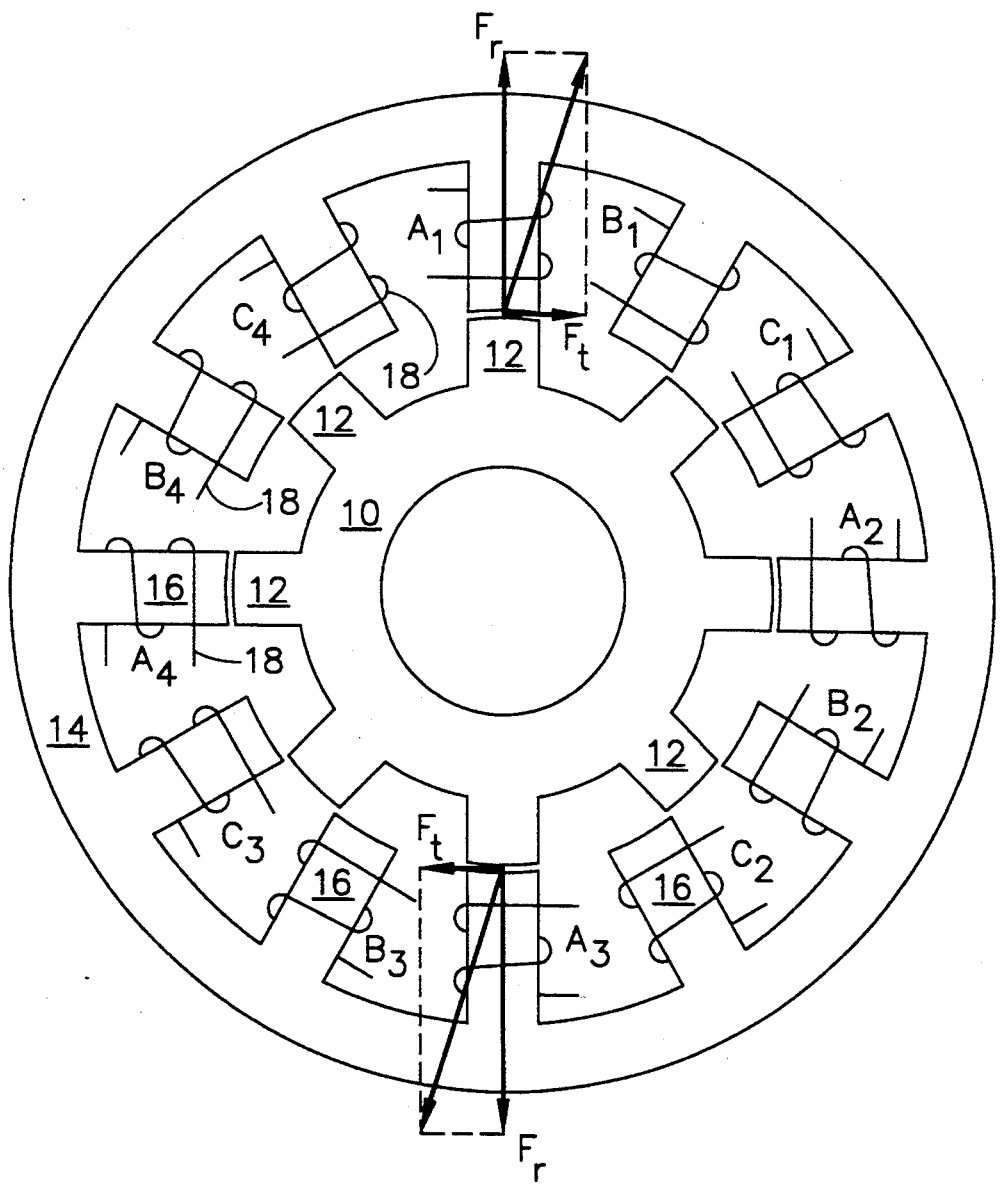
FIG. 1 illustrates a switched reluctance machine according to the present invention.

FIG. 1 illustrates a three phase switched reluctance machine with 12 subwindings according to the present invention. In the switched reluctance machine illustrated in FIG. 1, rotor 10 includes rotor teeth 12, stator 14 includes stator teeth 16. Stator teeth 16 include individual stator windings 18 each of which may also be referred to as a subwinding. In a conventional switched reluctance machine, groups of individual subwindings 18 (e.g. $A_1$, $A_2$, $A_3$, $A_4$ for phase A) would be connected in series to form a plurality of phase windings and each phase winding would be individually excited to control the motion of rotor 10.

In the embodiment of FIG. 1, rotor 10 is not supported by a mechanical bearing, individual subwindings 18 are excited to provide both magnetic bearing force and switched reluctance torque. For example, the switched reluctance torque is generated by simultaneously exciting all of the windings which comprise a phase winding (e.g. windings $A_1$, $A_2$, $A_3$ and $A_4$). Since the force generated by exciting the subwindings has both a radial and a tangential component, the tangential component may be used to spin the rotor while the radial force is employed to support the rotor.

By way of illustration, excitation of one stator winding 18 generates a force which has a component ($F_t$) in a direction tangential to the circumference of rotor 10 and an additional component ($F_r$) which acts along the radius of the rotor as illustrated by the corresponding force vectors in FIG. 1. With rotor 10 constrained (e.g. by a mechanical bearing) to rotational movement as in a conventional switched reluctance machine, tangential force component $F_t$ would cause rotor 10 to rotate. However, if the mechanical bearing is removed, rotor 10 is no longer constrained and may move radially as well as rotationally, therefore, it is necessary to generate net radial forces to maintain the rotor in a predetermined axial position. These controlled radial forces act as a magnetic bearing, performing the function that a mechanical bearing performs in a conventional switched reluctance machine. Therefore, by placing the subwinding phase currents under independent control according to the present invention, a net radial force may be directed over 360° to generate a magnetic bearing effect.

Figure 2:
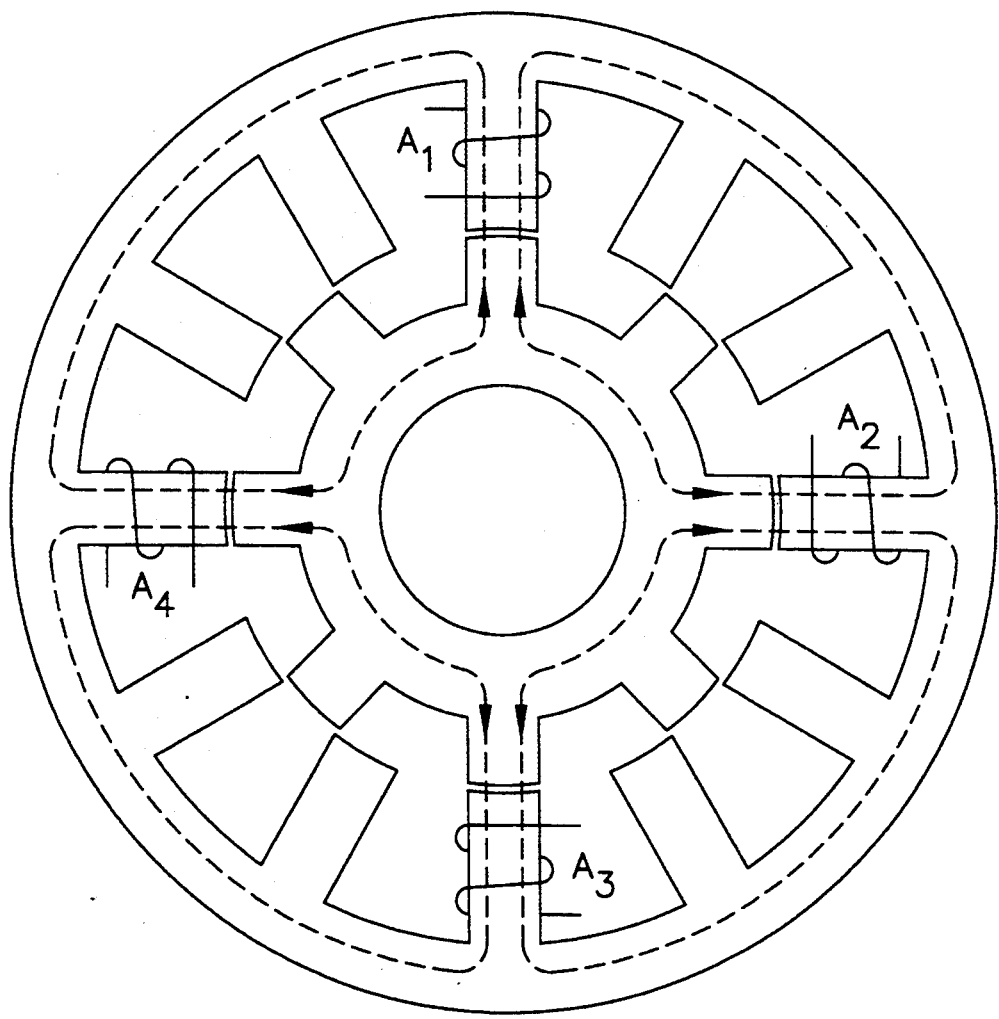
FIG. 2 illustrates a switched reluctance machine according to an alternative embodiment of the present invention.

FIG. 2 illustrates a further embodiment of the present invention wherein four independent stator windings $A_1$–$A_4$ are illustrated. In the embodiment of FIG. 2, a net radial force may be created by separately exciting phase subwindings $A1$–$A4$ while holding the tangential force generated in each of the phase windings nearly constant. Since the current in each of the phase subwindings $A_1$–$A_4$ generates a force having a radial component $F_t$ and a tangential component $F_r$, these force components add to form a total radial and total tangential force on the rotor. If the currents in each of the phase subwindings $A_1$–$A_4$ are equal, the magnetic flux generated is distributed as illustrated in FIG. 2, resulting in a net tangential force and no net radial force so long as rotor 10 is centered in the machine. If, while maintaining the current in $A_2$ and $A_4$ constant, the current in $A_1$ is increased while the current in $A_3$ is decreased by a proportional amount, the total tangential force on the rotor remains constant since $F_{tA1}$ and $F_{tA3}$ sum with $F_{tA2}$ and $F_{tA4}$ to form a total $F_t$. However, a net radial force in the direction of $A_1$ is now present since $F_{rA1}$ has been increased while $F_{rA2}$ has been decreased. Therefore, by distributing the total phase current among the phase subwindings, it is possible to control the radial forces on the rotor while maintaining the tangential forces substantially constant. In FIG. 2, it will be understood that this technique may be extended to the phase subwindings $A_2$ and $A_4$ to provide 360° of position control for rotor 10.

It is therefore possible to control net average radial force, and thereby achieve radial control of rotor position, via perturbation of torque-producing currents in a minimum of four subwindings such as $A_1$–$A_4$ in FIG. 2. In the embodiment illustrated in FIG. 2, the remaining phase subwindings may be connected in series as in a conventional switched reluctance machine.

However, the radial forces produced by the subwindings of each phase will be pulsating in nature due to the commutation of current from phase to phase inherent in SRM torque production. These pulsating forces will occur at a frequency equal to the number of rotor poles times the machine's rotational speed. In order to reduce the radial force ripple magnitude and increase the ripple frequency for the integrated magnetic bearing/switched reluctance machine, radial force control can be extended to the remaining phases via current control of the individual sub windings $B_1$–$B_4$ and/or $C_1$–$C_4$ of FIG. 1. With all machine subwindings under individual current control, responsibility for control of radial rotor position can also commutate from phase to phase along with machine torque control.

One of the unique advantages of a switched reluctance machine as compared to other machine types is the ability to continue functioning at reduced torque capacities in the presence of a variety of machine or power electronic faults. The present invention extends this fault tolerance to an integrated magnetic bearing/switched reluctance machine with the additional of individual subwinding current control of phase B ($B_1$–$B_4$) and/or phase C ($C_1$–$C_4$) of FIG. 1. In the embodiment of FIG. 1, the loss of phase A subwinding can be compensated since the four phase B and/or four phase C subwindings could be used to support the rotor over 360° as illustrated in the embodiment of FIG. 2.

While preferred embodiments of the present invention have been shown and described herein, it will be obvious to those skilled in the art that such embodiments are provided by way of example only. Numerous variations, changes, and substitutions will now occur to those skilled in the art without departing from the invention. Accordingly, it is intended that the invention be limited only by the spirit and scope of the appended claims.

We claim:

1. A switched reluctance machine comprising:
   a rotor including rotor teeth;
   a stator including stator teeth each wound with an individual phase subwinding; and
   said subwindings being arranged in a common phase winding group, and being separately and simultaneously excitable by respective phase currents collectively comprising a total phase current for effecting a total tangential force to magnetically spin said rotor, with said total phase current being distributable among said subwindings in inverse proportions to correspondingly effect a net radial force to magnetically support said rotor.

2. A switched reluctance machine comprising:
   a rotor including a plurality of circumferentially spaced apart rotor teeth;
   a stator including a plurality of stator teeth disposed in opposite pairs around said rotor;
   a plurality of individual stator subwindings arranged in a common phase winding group, each of said subwindings being disposed on a respective one of said stator teeth; and
   said individual subwindings in said group being separately and simultaneously excitable by respective phase currents collectively comprising a total phase current for effecting a total tangential force to magnetically spin said rotor, with said total phase current being distributable among said subwindings in inverse proportions to correspondingly effect a net radial force to magnetically support said rotor.

3. A machine according to claim 2 wherein said stator teeth are disposed in diametrically opposite pairs, and said subwindings thereon are separately and simultaneously excitable for increasing said phase current in one of said subwindings while decreasing said phase current in said subwinding on a diametrically opposite stator tooth for effecting said net radial force.

4. A machine according to claim 3 wherein said phase winding group includes four of said subwindings arranged on two diametrically opposite stator teeth pairs.

5. A machine according to claim 3 wherein said subwindings are arranged in a plurality of said phase winding groups, with a first one of said groups having said subwindings thereof being separately and simultaneously excitable to effect said total tangential force and net radial force on said rotor, and a second one of said groups having said subwindings thereof connected in series.

6. A machine according to claim 5 further including a third one of said phase winding groups including said subwindings thereof connected in series.

7. A machine according to claim 3 wherein said subwindings are arranged in a plurality of said phase winding groups, with a first one of said groups having said subwindings thereof being separately and simultaneously excitable to effect said total tangential force and net radial force on said rotor, and a second one of said groups also having said subwindings thereof being separately and simultaneously excitable to effect said total tangential force and net radial force on said rotor, with said phase currents being commutated to said first and second groups in different phases.

8. A machine according to claim 7 further including a third one of said phase winding groups also having said subwindings thereof being separately and simultaneously excitable to effect said total tangential force and net radial force on said rotor, with said phase currents being commutated to said first, second, and third groups in different phases.

9. A machine according to claim 8 wherein each of said three phase winding groups includes four of said subwindings arranged on two diametrically opposite stator teeth pairs.

10. A machine according to claim 3 characterized by the absence of a mechanical bearing providing radial constraint of said rotor inside said stator, and wherein radial constraint of said rotor inside said stator is instead provided by a magnetic bearing defined by said subwindings being separately and simultaneously excitable to effect said net radial force on said rotor for centering said rotor in said stator.

11. A method of controlling a switched reluctance machine having a rotor with rotor teeth, a stator with stator teeth, and individual subwindings wound on respective ones of said stator teeth, said method comprising:

separately and simultaneously exciting a plurality of said subwindings in a common phase winding group with respective phase currents collectively comprising a total phase current for effecting a total tangential force to magnetically spin said rotor; and distributing said total phase current among said subwindings in inverse proportions to correspondingly effect a net radial force to magnetically support said rotor.

12. A method according to claim 11 wherein said stator teeth are disposed in diametrically opposite pairs, and said subwindings thereon are separately and simultaneously excitable for increasing said phase current in one of said subwindings while decreasing said phase current in said subwinding on a diametrically opposite stator tooth for effecting said net radial force.

13. A method according to claim 12 wherein said phase winding group includes four of said subwindings arranged on two diametrically opposite stator teeth pairs.

14. A method according to claim 12 wherein said subwindings are arranged in a plurality of said phase winding groups, with a first one of said groups having said subwindings thereof being separately and simultaneously excitable to effect said total tangential force and net radial force on said rotor, and a second one of said groups having said subwindings thereof connected in series.

15. A method according to claim 14 further including a third one of said phase winding groups including said subwindings thereof connected in series.

16. A method according to claim 12 wherein said subwindings are arranged in a plurality of said phase winding groups, with a first one of said groups having said subwindings thereof being separately and simultaneously excitable to effect said total tangential force and net radial force on said rotor, and a second one of said groups also having said subwindings thereof being separately and simultaneously excitable to effect said total tangential force and net radial force on said rotor; and said method further comprises:

commutating said phase currents between said first and second groups in different phases.

17. A method according to claim 16 further including a third one of said phase winding groups also having said subwindings thereof being separately and simultaneously excitable to effect said total tangential force and net radial force on said rotor; and said method further comprises:

commutating said phase currents between said first, second, and third groups in different phases.

18. A method according to claim 17 wherein each of said three phase winding groups includes four of said subwindings arranged on two diametrically opposite stator teeth pairs.

19. A method according to claim 12 characterized by the absence of a mechanical bearing providing radial constraint of said rotor inside said stator, and wherein radial constraint of said rotor inside said stator is instead provided by a magnetic bearing defined by said subwindings being separately and simultaneously excited to effect said net radial force on said rotor for centering said rotor in said stator.

* * * * *